(No Model.)
G. B. NICHOLS.
TELLURIAN.
No. 522,082. Patented June 26, 1894.
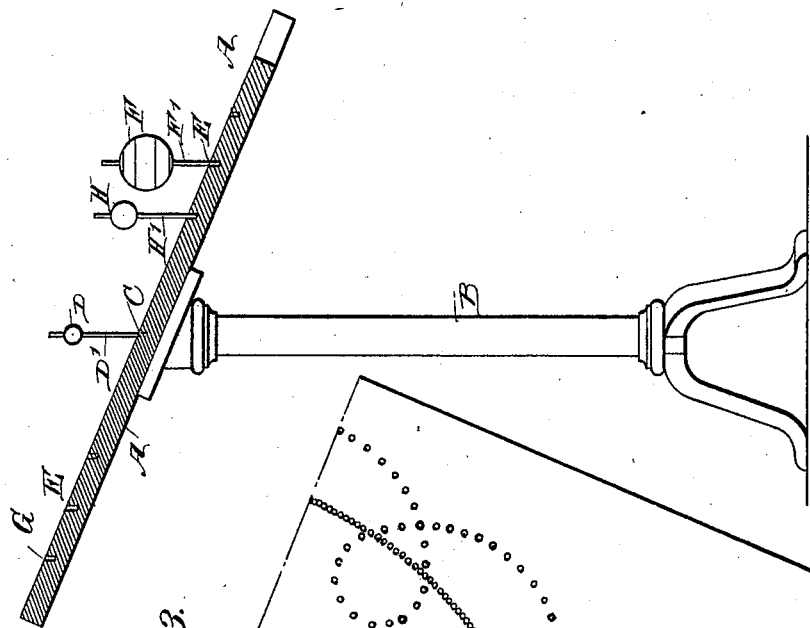
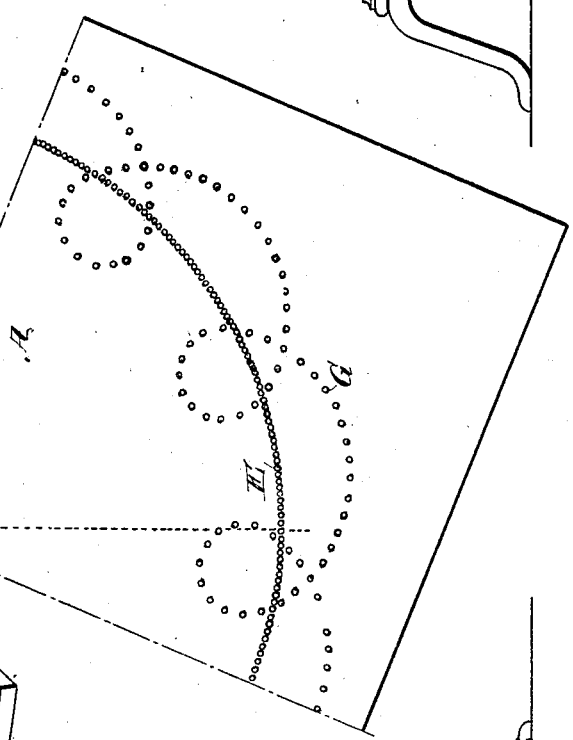
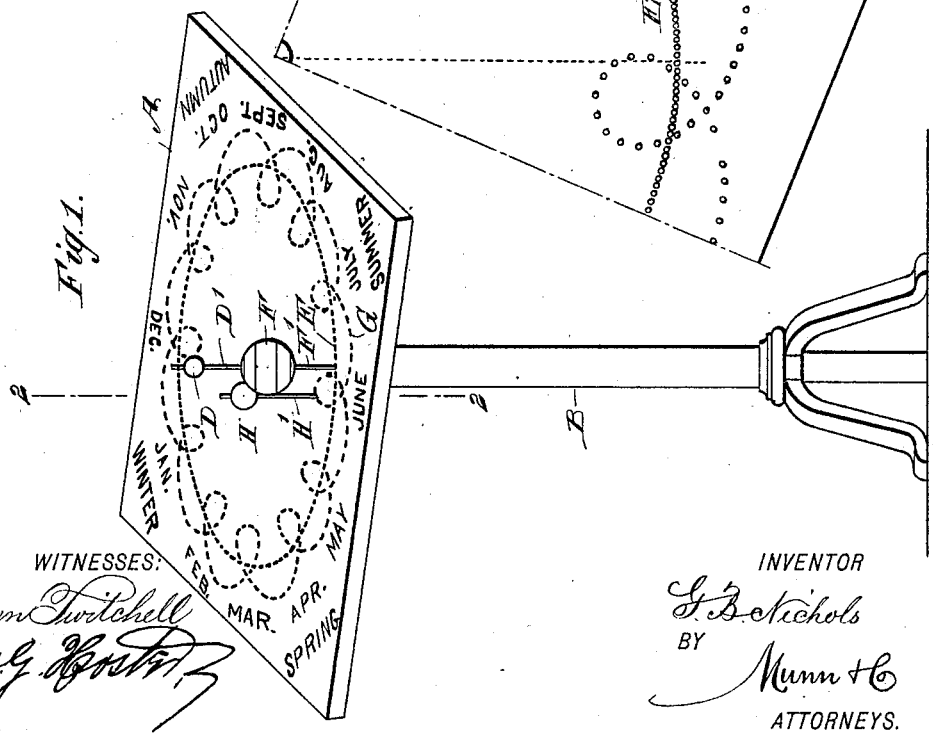
WITNESSES:
INVENTOR
G. B. Nichols
BY
Munn & Co.
ATTORNEYS.

UNITED STATES PATENT OFFICE.

GRANT B. NICHOLS, OF WAPAKONETA, OHIO.

TELLURIAN.

SPECIFICATION forming part of Letters Patent No. 522,082, dated June 26, 1894.

Application filed April 12, 1894. Serial No. 507,259. (No model.)

*To all whom it may concern:*

Be it known that I, GRANT B. NICHOLS, of Wapakoneta, in the county of Auglaize and State of Ohio, have invented a new and Improved Tellurian, of which the following is a full, clear, and exact description.

The object of the invention is to provide a new and improved tellurian, which is simple and durable in construction, more especially designed for use in schools, houses, offices, &c., and arranged to show the causes of the seasons, and the relative positions of the sun, earth and moon, without much difficulty and in a very effective and natural manner.

The invention consists of an inclined table provided with a series of vertically disposed apertures or recesses arranged in an ellipse representing the path of the earth around the sun, the said apertures being adapted to receive a rod carrying a ball representing the earth, the rod representing the earth's axis.

The invention further consists of a second set of apertures in the said table, arranged in a line representing the path of the moon relative to the said elliptical path of the earth.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a perspective view of the improvement. Fig. 2 is a transverse section of the same on the line 2—2 of Fig. 1; and Fig. 3 is an enlarged plan view of part of the table.

The improved tellurian is provided with a table A, supported in an inclined position on a suitable stand B, and formed at or near its middle with a recess or aperture C, adapted to receive the rod D', extending vertically and carrying a ball D, representing the sun. In the said table A is also formed a series of apertures E, arranged in an ellipse the center of which is the aperture C, the said ellipse representing the path of the earth around the sun. The apertures E are three hundred and sixty-five in number and represent the days in the year, the said apertures being preferably numbered according to days in the month, the name of which is affixed on the surface of the table at the corresponding place, as indicated in Fig. 1. A vertically-disposed rod F', is adapted to be seated in one of the apertures E, the said rod carrying a globe F, representing the earth, having as its axis the said rod F'. A second series of apertures G, is formed in the top of the table A, the said apertures representing the path of the moon relative to the said elliptical path of the earth, represented by the series of apertures E. A vertically-disposed rod H', is adapted to be inserted in one of the said apertures G and the said rod carries a ball H, representing the moon, having as its axis the rod H'. The corners of the table A are preferably marked either by words or by pictures to represent the seasons of the year, and other suitable descriptive matter may be arranged on the table and the said balls representing the said sun, earth and moon have shown thereon such matter as may be considered instructive regarding celestial occurrences, &c.

It will be seen that by the arrangement described, the earth represented by the ball F can at any time be inserted on the proper date in the respective aperture, and likewise the moon represented by the ball H can be put in proper position at the given date, so as to show the relative positions of the earth to the sun and that of the moon to the earth and likewise to the sun. It will further be seen that by having the table A in an inclined position and the axes of the sun, earth and moon vertical and parallel to each other, the seasons will show in a natural, easy and plain manner to the observer, so as to be readily comprehended by children and others. The apertures G representing the path of the moon are also preferably marked or numbered, so as to readily indicate the day of the year corresponding to an aperture of the series of apertures E marked the same day.

The apertures E are all of the same depth, while the apertures G representing the path of the moon are of different depth, so that the moon's orbit about the earth is not so much inclined as the earth's orbit about the sun, and whereby the moon is always represented in the proper position relative to the earth and sun.

Having thus fully described my invention, I claim as new and desire to secure by Letters Patent—

1. A tellurian, comprising an inclined table provided with a series of vertically disposed apertures or recesses arranged in an ellipse, representing the path of the earth around the sun, and a ball representing the earth and having a vertically disposed projecting rod representing the earth's axis, the said rod being adapted to be inserted in one of the said apertures or recesses, substantially as shown and described.

2. A tellurian provided with an inclined table having a series of marked apertures or recesses vertically disposed and arranged in an ellipse, representing the path of the earth around the sun, the apertures corresponding in number to the days in a year, substantially as shown and described.

3. A tellurian provided with an inclined table having a series of marked apertures or recesses arranged in an ellipse, representing the path of the earth around the sun, the apertures corresponding in number to the days in a year, and a second series of apertures arranged in the said table and in a line representing the path of the moon relative to the said elliptical path of the earth, substantially as shown and described.

4. A tellurian comprising an inclined table provided with a series of vertically-disposed apertures or recesses arranged in an ellipse, representing the path of the earth around the sun, a second series of apertures in the said table and arranged in a line representing the path of the moon relative to the said elliptical path of the earth, a ball representing the earth and held on a rod representing the earth's axis, and adapted to be set in one of the first named series of apertures or recesses, and a second ball representing the moon and held on a rod representing the moon's axis and adapted to be set in one of the apertures in the said second set of apertures, substantially as shown and described.

5. A tellurian comprising an inclined table provided with a series of vertically-disposed apertures or recesses arranged in an ellipse, representing the path of the earth around the sun, a second series of apertures in the said table and arranged in a line representing the path of the moon relative to the said elliptical path of the earth, a ball representing the earth and held on a rod representing the earth's axis, and adapted to be set in one of the first named series of apertures or recesses, a second ball representing the moon and held on a rod representing the moon's axis and adapted to be set in one of the apertures in the said second set of apertures, and a third ball representing the sun and held on a rod set in an aperture in the center of the said ellipse, substantially as shown and described.

GRANT B. NICHOLS.

Witnesses:
R. U. HASTINGS,
R. C. NICHOLS.